UNITED STATES PATENT OFFICE.

PHILIPP PORGES, OF VIENNA, AUSTRIA-HUNGARY.

CRUDE-OIL PREHEATER.

1,144,780.          Specification of Letters Patent.      Patented June 29, 1915.

Application filed February 10, 1914. Serial No. 817,955.

*To all whom it may concern:*

Be it known that I, PHILIPP PORGES, vice-president, a subject of the Emperor of Austria-Hungary, and a resident of Vienna, in the Empire of Austria-Hungary (whose post-office address is Vienna, I, Stubenring 12,) have invented a Crude-Oil Preheater, of which the following is a specification.

The utilization of the heat contained in the distillates, for the purpose of pre-heating crude oil has been carried out heretofore (see for example the Austrian Letters Patent No. 6245) in such manner, that the distillates, the heat whereof is to be utilized, are conducted into distributers, which are disposed outside of the pre-heating vessel. This arrangement is disadvantageous. It causes considerable loss of heat, since the distributing pipes placed outside of the pre-heater, together with their numerous fittings, flanges and pipe-connections, constitute a radiating surface which is quite extensive. If, in time, the necessity of renewing the pipes arises then it becomes necessary to remove the distributers or manifolds and to remove pipes from their wall, and such work of dismounting and also of replacing such pipes, produces considerable difficulties, and besides derangements in the working of the plant; it causes delays in boiling and overflow of the contents of the pre-heater. These drawbacks are obviated by the present invention, by arranging the distributers or manifolds in the interior of the pre-heater. Thereby all losses due to radiation are avoided, or in other words, substantially all of the heat is utilized to heat the crude oil. The exchangeability of the pipes is much easier than for example, with the pre-heater according to the Austrian Letters Patent No. 6245. The pipes may be arranged at will in the lowest part of the casing of the pre-heater, as near as possible to the casing, whereby the lowest contents of the pre-heater vessel becomes heated. The bottom of the pre-heater-vessel remains absolutely free and may be utilized for fitting thereto all the necessary fittings as inlet- and outlet-connections, thermometers, manometers and also a man-hole; the arrangement of such fittings on the said part has met until now with difficulties. The arrangement may be executed in such manner that the pipes may expand and contract under the influence of heat without obstruction, whereby the pipe connections are not submitted to any stress and whereby the packings are secured from injuries caused otherwise by expansions of the piping.

Figure 1:
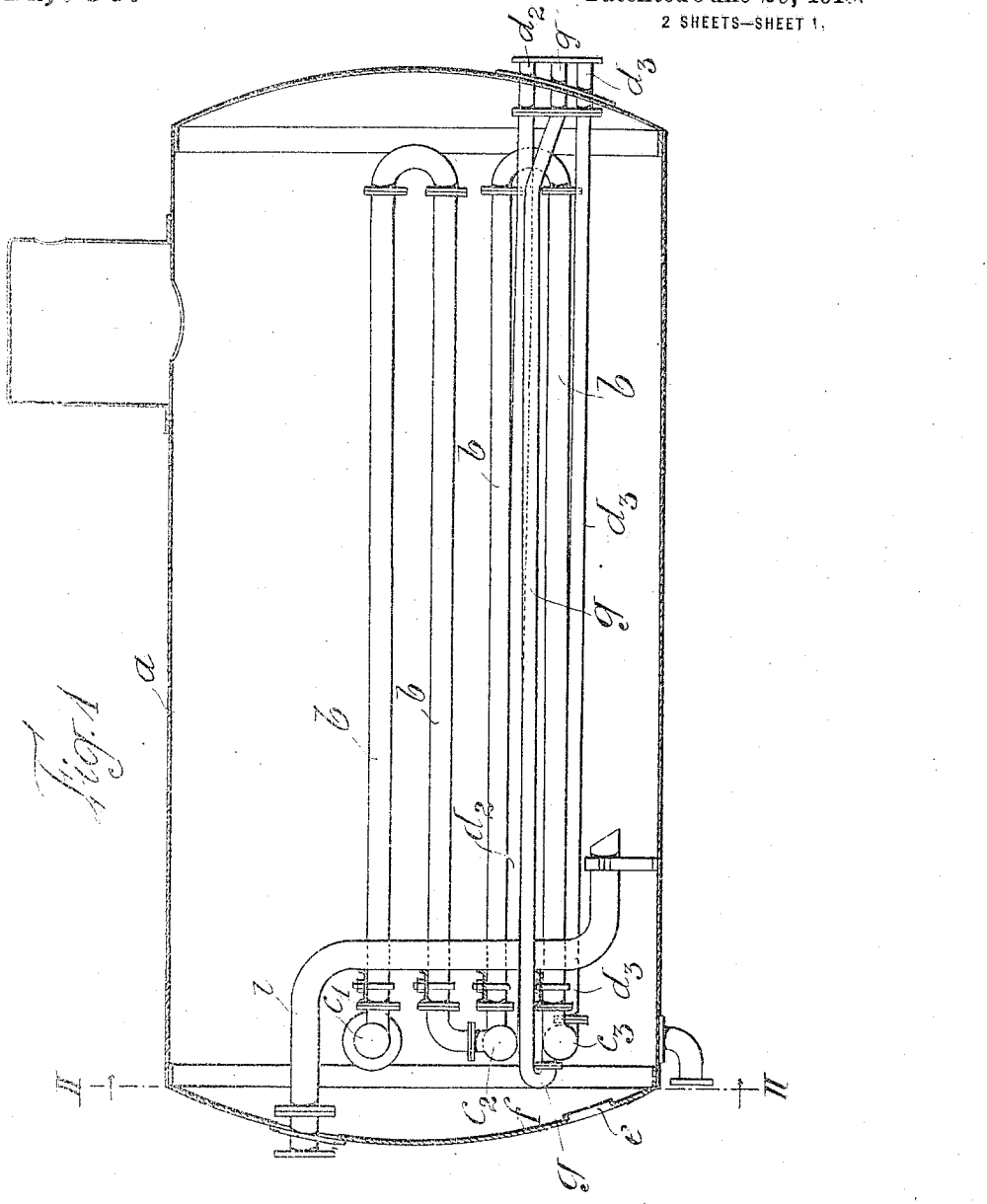
Figure 2:
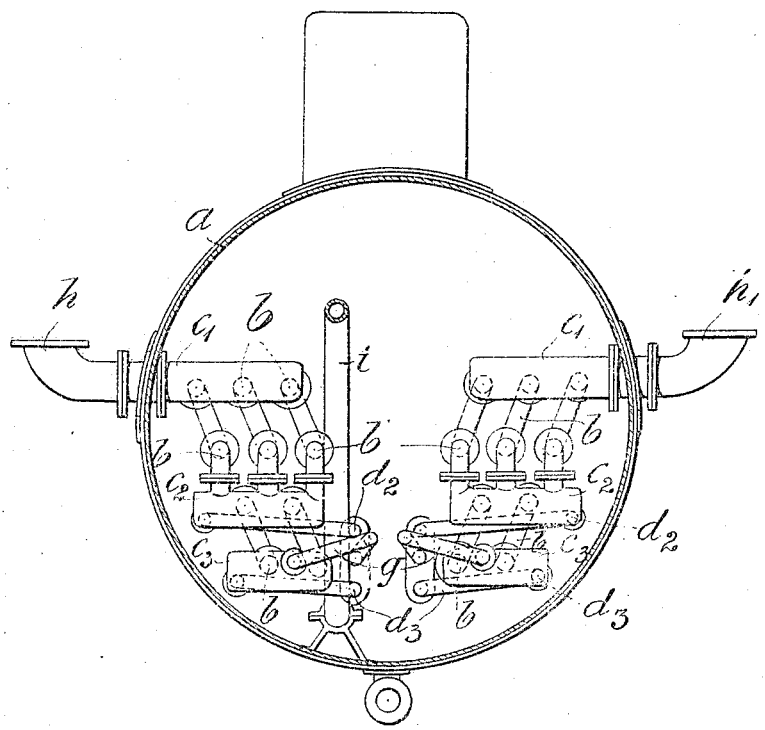

In the accompanying drawings one mode of carrying the invention into practice is shown in Figure 1 in longitudinal section and in Fig. 2 in transverse section on the line II—II Fig. 1.

$a$ is the pre-heater vessel, $b$ are the pipes (if desired, pipes with radiating surfaces thereon), through which pass the distillates; $c_1$, $c_2$, $c_3$ are the distributers or manifolds for connecting the pipes $b$. The distillates are introduced by inlet-connections $h$ $h_1$ into the uppermost distributer or manifold $c_1$ and the condensed products are taken off from the manifolds or distributers $c_2$ $c_3$ at the lowest point by means of pipes $d_2$, $d_3$; equally the vapors, which are not yet condensed, are taken off by means of a duct $g$ at the highest point of the distributer or manifold $c_3$. The ducts $d_2$ $d_3$ $g$ are led outwardly as near as possible to the vertical center line of the pre-heater-vessel.

$i$ is the inlet for the crude oil.

$e$ is a man-hole, which may be situated at any suitable place, since the bottom is left entirely free, so that no collision with the piping system occurs.

With the form of the invention, as illustrated in the drawings, the manifold or distributer, that is the inlet-distributer $c_1$ is fixed to the pre-heater vessel, whereas the other distributers $c_2$ $c_3$ are freely movable whereby the pipes $b$ may expand and contract freely under the influence of heat and whereby leakages at the joints by expansions of the pipes are avoided. The inlet $h$ or $h_1$ respectively is arranged laterally, whereby the same remains uninfluenced by the play of the casing, in the longitudinal direction as caused by expansion, the inlet remaining thereby unchangeable in its position.

By the use of pipes provided with ribs or of wave-like bent pipes as inner pipes the heating surface is increased; by suitably adjusting such ribs upon the pipes obstacles can be offered to the passing liquid. The ribs may be fixed to the pipes or they may be screwed to smooth pipes.

Having described the nature of my invention, what I claim is:

1. A pre-heater for crude oil, comprising a vessel, an inlet distributer or manifold, other distributers or manifolds, said distributers or manifolds being superposed within said vessel, condensation pipes connecting one distributer with another, in serial order, separate pipes connected to separate manifolds for leading off different fractions of the distillate, said inlet manifold being attached to the vessel, said other manifolds being detached from said vessel.

2. A pre-heater for crude oil, comprising a vessel, an inlet distributer or manifold, other distributers or manifolds, said distributers or manifolds being superposed within said vessel, condensation pipes connecting one distributer with another, in serial order, separate pipes connected to separate manifolds for leading off different fractions of the distillate, said inlet manifold being attached to the vessel, said other manifolds being detached from said vessel, said distributer last in serial order having a pipe connected thereto for leading off the uncondensed vapors.

3. A pre-heater for crude oil, comprising a vessel, an inlet distributer or manifold, other distributers or manifolds, said distributers or manifolds being superposed within said vessel, condensation pipes connecting one distributer with another, in serial order, separate pipes connected to separate manifolds for leading off different fractions of the distillate, said inlet manifold being attached to a longitudinal side of the vessel, said other manifolds being detached from said vessel.

4. A pre-heater for crude oil, comprising a vessel, with a system of return-pipes therein for circulation of distillate gases, said pipes being connected to said vessel at the inlet ends of the pipes by means of a common inlet distributer fixed to the interior of the vessel and having the inlet on the longitudinal side of the vessel, the other ends of the pipes being connected to distributers arranged freely and movable, and provided with outlet pipes for the condensed distillate products running substantially the length of the vessel and arranged in said vessel as near as possible to the vertical center line thereof.

In witness whereof, I have hereunto signed my name in the presence of two subscribing witnesses.

PHILIPP PORGES.

Witnesses:
  HUGO REIK,
  AUGUST FUGGER.